(12) United States Patent
Isayeva et al.

(10) Patent No.: US 9,714,029 B2
(45) Date of Patent: Jul. 25, 2017

(54) VEHICLE ELECTRIC MACHINE CONTROL STRATEGY

(75) Inventors: Rimma Isayeva, Farmington Hills, MI (US); William Reynolds, Tecumseh (CA); Jonathan Andrew Butcher, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 761 days.

(21) Appl. No.: 13/601,130

(22) Filed: Aug. 31, 2012

(65) Prior Publication Data

US 2014/0067173 A1    Mar. 6, 2014

(51) Int. Cl.
*B60W 20/00* (2016.01)
*B60W 20/50* (2016.01)
*B60W 50/035* (2012.01)
*B60W 50/029* (2012.01)

(52) U.S. Cl.
CPC .......... *B60W 20/50* (2013.01); *B60W 50/035* (2013.01); *B60W 2050/0297* (2013.01); *Y10S 903/903* (2013.01)

(58) Field of Classification Search
None
See application file for complete search history.

(56) References Cited

U.S. PATENT DOCUMENTS

| | | | |
|---|---|---|---|
| 5,627,758 A * | 5/1997 | Lansberry | B60L 7/14 318/293 |
| 6,381,503 B1 * | 4/2002 | Dollhopf | G05B 19/0421 340/644 |
| 6,405,818 B1 | 6/2002 | Anthony et al. | |
| 6,897,629 B2 * | 5/2005 | Wilton | B60L 3/0046 318/139 |
| 6,898,494 B2 * | 5/2005 | Nada | B60K 6/445 701/33.4 |
| 6,967,514 B2 * | 11/2005 | Kizer | H03K 5/1565 327/175 |
| 7,520,353 B2 * | 4/2009 | Severinsky | B60H 1/004 180/65.265 |
| 7,791,386 B2 * | 9/2010 | Kris | H03K 7/08 327/141 |
| 8,255,132 B2 * | 8/2012 | Tabata | B60K 6/365 701/51 |
| 8,437,897 B2 | 5/2013 | Blind et al. | |
| 8,731,765 B2 | 5/2014 | Wang et al. | |

(Continued)

FOREIGN PATENT DOCUMENTS

| | | |
|---|---|---|
| CN | 1321931 A | 11/2001 |
| CN | 101100961 A | 1/2008 |

(Continued)

*Primary Examiner* — Jean-Paul Cass
(74) *Attorney, Agent, or Firm* — David B. Kelley; Brooks Kushman P.C.

(57) ABSTRACT

A vehicle includes at least one electric machine and an inverter for selectively transmitting power to the electric machine. The inverter includes a power module. At least one controller controls the electric machine and the inverter. The controller at least temporarily disables the inverter during a power cycle such that power to the electric machine is inhibited. In response to the disabling of the inverter, the controller resets the duty cycle commands for the power module, and re-enables the inverter during the same power cycle.

14 Claims, 4 Drawing Sheets

(56) References Cited

U.S. PATENT DOCUMENTS

| | | | |
|---|---|---|---|
| 2001/0027147 A1 | 10/2001 | Shinso et al. | |
| 2004/0075462 A1* | 4/2004 | Kizer | H03K 5/1565 |
| | | | 326/29 |
| 2008/0006236 A1 | 1/2008 | Yamashita et al. | |
| 2009/0121668 A1 | 5/2009 | West et al. | |
| 2010/0145559 A1 | 6/2010 | Gauthier et al. | |
| 2011/0317017 A1* | 12/2011 | Shin | H04W 4/005 |
| | | | 348/159 |

FOREIGN PATENT DOCUMENTS

| | | | |
|---|---|---|---|
| CN | 101983151 A | | 3/2011 |
| CN | 102849073 A | | 1/2013 |
| JP | 2010200540 | * | 9/2010 |
| KR | 2012061434 | * | 6/2012 |

* cited by examiner

VEHICLE ELECTRIC MACHINE CONTROL STRATEGY

TECHNICAL FIELD

The present disclosure relates to a system for controlling an electric machine in an electric vehicle.

BACKGROUND

Battery electric vehicles (BEVs) include a fraction battery that is rechargeable from an external electric power source and powers the electric machine. Hybrid electric vehicles (HEVs) include an internal combustion engine, one or more electric machines, and a fraction battery that at least partially powers the electric machine. Plug-in hybrid electric vehicles (PHEVs) are similar to HEVs, but the traction battery in a PHEV is capable of recharging from an external electric power source. These vehicles are examples of vehicles that are capable of being at least partially driven by an electric machine.

In these vehicles, if a failure of a component necessary for electric propulsion is detected, several actions may be necessary to ensure the safety of the vehicle occupants. Since shutdown of the entire vehicle may be undesirable, limited operation strategy (LOS) modes can be implemented to enable the operator of the vehicle to continue to drive while individual components are disabled.

SUMMARY

In one embodiment, a vehicle includes an electric machine and at least one controller. The at least one controller is configured to, in response to a disabling of the electric machine during a drive cycle, reset duty cycle commands for the electric machine and re-enable the electric machine during the drive cycle within a predefined time period from the disabling of the electric machine. In response to the electric machine being disabled for a time period greater than the predefined time period, the at least one controller inhibits the electric machine from being re-enabled during the drive cycle.

In another embodiment, a method of controlling an electric machine in a vehicle is provided. The electric machine is disabled during a drive cycle of the vehicle in response to detecting a presence of a fault condition associated with the electric machine. The electric machine is re-enabled during the drive cycle within a predefined time period from the disabling of the electric machine in response to detecting an absence of the fault condition.

In another embodiment, a method of controlling an electric machine in a vehicle is provided. The electric machine is disabled during a drive cycle of the vehicle in response to detecting a presence of a fault condition associated with the electric machine. The duty cycles are reset. The electric machine is then re-enabled during the drive cycle in response to detecting an absence of the fault condition.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
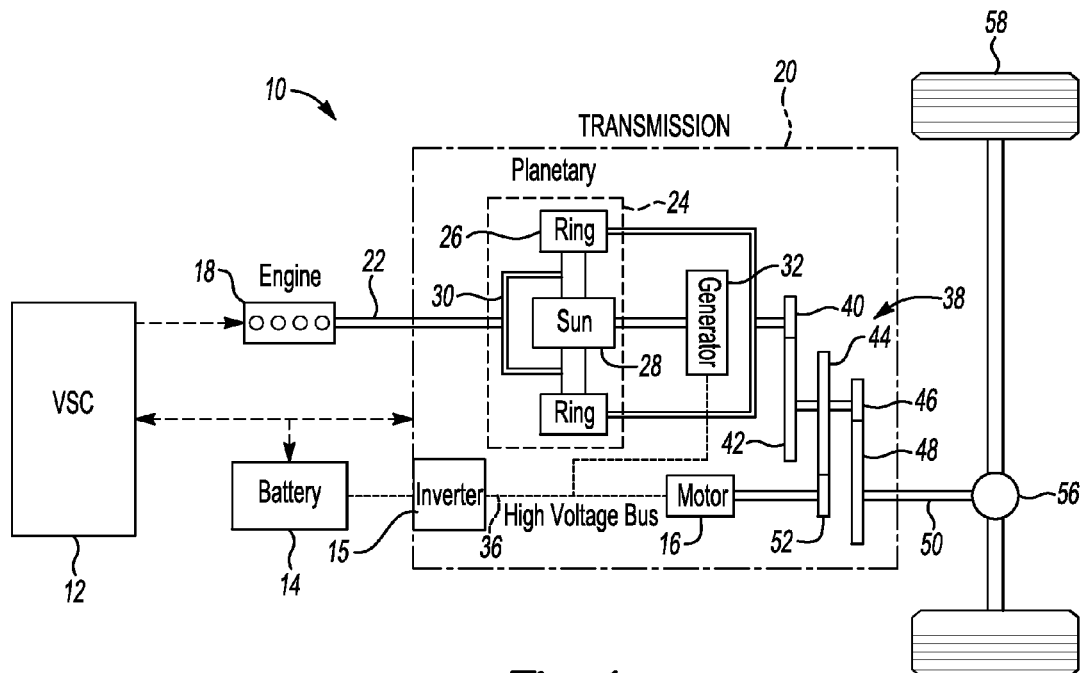
FIG. 1 is a schematic diagram of a vehicle.

Referring to FIG. 1, a vehicle 10 is illustrated with a power-split powertrain. A vehicle system controller (VSC) 12 is provided, and can generally be referred to as a controller. The VSC 12 controls the power distribution in the powertrain or driveline of the vehicle 10. A traction battery, or battery 14 is provided and is controlled by the VSC 12. The battery 14 has a two-way electrical connection, such that it receives and stores electric energy through regenerative braking, for example, and also supplies the energy to an electric machine, or an electric traction motor 16. An inverter 15 is provided to selectively enable/disable electrical flow from the battery 14 to the motor 16. The inverter 15 converts direct current (DC) from the battery into alternating current (AC) for powering the electric machine. Alternatively, during regenerative braking, the inverter 15 converts AC from the electric machine into DC such that electric power is stored in the battery 14.

Although the control system of the vehicle 10 is illustrated to have a VSC 12, such a control system can involve more than one controller, as desired. For example, a separate battery control module can directly control the battery 14. Furthermore, a separate motor control module can be directly connected to the motor 16 and to the other controllers in the vehicle 10. It should be understood that all contemplated controllers in the vehicle 10 can be referred to as a "controller", and the VSC 12 is not necessarily limited to only one controller. Separate additional controllers and their hierarchy will be described with reference to FIG. 2.

An internal combustion engine (ICE) 18 is also a power source for the vehicle 10. The VSC 12 controls the operation of engine 18. Both the motor 16 and the engine 18 are capable of powering a transmission 20 that ultimately delivers torque to the wheels of the vehicle 10.

The engine 18 delivers power to a torque input shaft 22 that is connected to a planetary gear set 24 via a one way clutch. The input shaft 22 powers the planetary gear set 24. The planetary gear set 24 includes a ring gear 26, a sun gear 28, and a planetary carrier assembly 30. The input shaft 22 is driveably connected to the carrier assembly 30 which, when powered, can rotate the ring gear 26 and/or the sun gear 28. The sun gear 28 is driveably connected to a generator 32. The generator 32 may be engaged with the sun gear 28, such that the generator 32 may either rotate with the sun gear 28, or not rotate with it. Like the motor 16, the generator 32 may be referred to as an electric machine which, when utilized in other vehicle powertrain configurations, is capable of both generating electric power and providing motive power.

When the engine 18 is driveably coupled to the planetary gear set 24, the generator 32 generates energy as a reactionary element to the operation of the planetary gear set 24. Electric energy generated from the generator 32 is transferred to the battery 14 through electrical connections 36. The battery 14 also receives and stores electric energy through regenerative braking, in known fashion. The battery 14 supplies the stored electric energy to the motor 16 for operation. The portion of the power delivered from the engine 18 to the generator 32 may also be transmitted directly to the motor 16. The battery 14, motor 16, and generator 32 are each interconnected in a two-way electric flow path through electrical connections 36. The VSC 12 controls the components in the powertrain to provide proper torque distribution to the wheels.

It should be understood that the motor 16 and the generator 32 can both be referred to as an electric machine. Each electric machine can operate as a generator by receiving torque from the engine 18 and supplying AC voltage to the inverter 15, whereby the inverter 15 converts the voltage into DC voltage to charge the battery 14. The electric machine can also operate as a generator by utilizing regenerative braking to convert the braking energy of the vehicle into electric energy to be stored in the battery 14. Alternatively, the electric machine can operate as a motor whereby the electric machine receives power from the inverter 15 and the battery 14 and provides torque through transmission 20 and ultimately to the wheels.

The inverter 15 selectively powers the motor 16 and the generator 32. The inverter 15 can include a motor inverter for selectively disabling the motor 16, and a generator inverter for selectively disabling the generator 32. The inverter 15 can also include a boost converter or a variable voltage controller (VVC) for altering voltage between the battery 14 and the motor 16 and the generator 32.

The vehicle may be powered by the engine 18 alone, by the battery 14 and motor 16 alone, or by a combination of the engine 18 with the battery 14 and motor 16. In a mechanical drive mode, or a first mode of operation, the engine 18 is activated to deliver torque through the planetary gear set 24. The ring gear 26 distributes torque to step ratio gears 38 comprising meshing gear elements 40, 42, 44, and 46. Gears 42, 44, and 46 are mounted on a countershaft, and gear 46 distributes torque to gear 48. Gear 48 then distributes torque to a torque output shaft 50. In the mechanical drive mode, the motor 16 may also be activated to assist the engine 18 in powering the transmission 20. When the motor 16 is active in assisting, gear 52 distributes torque to gear 44 and to the countershaft.

In an electric drive mode (EV mode), or a second mode of operation, the engine 18 is disabled or otherwise prevented from distributing torque to the torque output shaft 50. In the EV mode, the battery 14 powers the motor 16 to distribute torque through the step ratio gears 38 and to the torque output shaft 50. The torque output shaft 50 is connected to a differential and axle mechanism 56 which distributes torque to traction wheels 58. The VSC 12 controls each of the battery 14, motor 16, engine 18 and generator 32 to distribute torque to the wheels 58 in either the mechanical drive mode or the EV mode according to driver torque demands.

As previously described, there are two power sources for the driveline. The first power source is the engine 18, which delivers torque to the planetary gear set 24. The other power source involves only the electric drive system, which includes the motor 16, the generator 32 and the battery 14, where the battery 14 acts as an energy storage medium for the generator 32 and the motor 16. The generator 32 may be driven by the planetary gear set 24, and may alternatively act as a motor and deliver power to the planetary gear set 24.

It should be understood that while a power-split powertrain is illustrated in the vehicle 10, the vehicle 10 can include many other configurations. As such, it is contemplated that individual components of the powertrain may differ to suit various particular applications. For example, in another configuration that does not include a planetary gear set 24, an electric machine (motor/generator) can be provided to operate as a generator by receiving torque from the engine or regenerative braking, while the same electric machine can also operate as a motor by receiving power from the traction battery and providing torque through the transmission. Other vehicle configurations of vehicle powertrains and implementations of electric machines are contemplated, and are therefore considered to be within the scope of the present disclosure.

Figure 2:
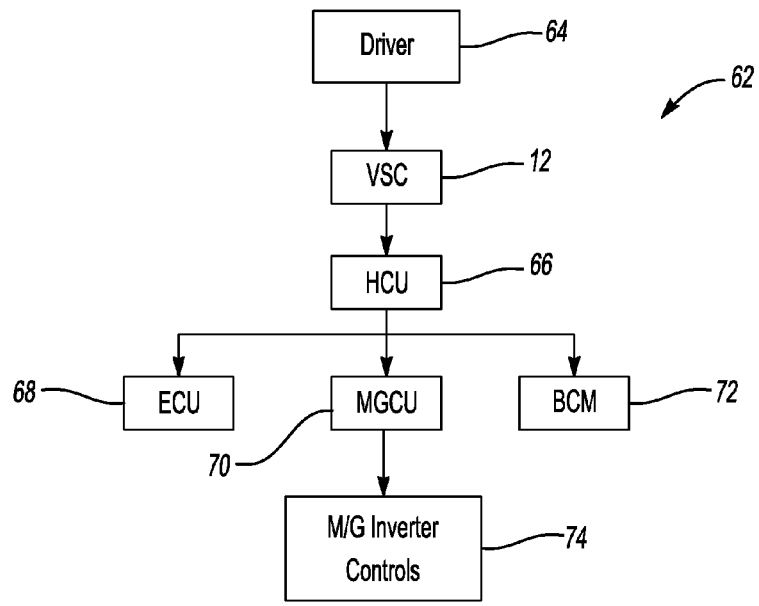
FIG. 2 is a block diagram illustrating an example of a control system of the vehicle.

Referring to FIG. 2, a block diagram illustrating a control system 62 within the vehicle 10 is shown. Driver demands or commands 64, such as acceleration request, are received by the VSC 12. The VSC 12 processes these driver demands 64 and communicates commands throughout the vehicle 10. As previously described, the VSC 12 is electrically connected to various subsystems in the vehicle 10 and acts as an overall control of the vehicle 10. For example, the VSC 12 is connected to a hybrid control unit (HCU) 66 that controls the hybrid-specific components in the vehicle 10, such as the motor 16, the generator 32, the battery 14 and/or the inverter 15.

The HCU 66 is communicatively connected to an engine control unit (ECU) 68 such that the HCU 66 commands the ECU 68 to control the engine 18 in various manners. The HCU 66 is also communicatively connected to a motor/generator control unit (MGCU) 70. The MGCU 70 receives commands from the HCU 66 and controls both the motor 16 and the generator 32 to provide and receive torque. In another embodiment, a separate control unit is provided for each of the motor 16 and the generator 32. A battery control module (BCM) 72 also receives commands from the HCU 66 and controls the power distribution of the battery 14. As illustrated in FIG. 2, motor/generator inverter controls 74 are communicatively connected to the MGCU 70. The motor/generator inverter controls receive commands from the MGCU 70 and opens and closes switches within the inverter 15 to enable and disable power flow to and from the electric machines.

A hierarchy of controllers is thus provided in the illustration shown in FIG. 2. Other hierarchies of controllers are contemplated without deviating from the scope of the present disclosure. For example, the VSC 12 may directly communicate with the MGCU 70 without the presence of an HCU 66. Other configurations are contemplated that would be beneficial for different particular vehicles.

The VSC controls each of the controllers 66-72, according to requested torque and power demands. It should again be understood that more or less controllers than those described herein are contemplated, and one or more of these controllers can communicatively cooperate to accomplish certain tasks. Any and all of these controllers or combination thereof can simply be referred to as a "controller".

Certain fault conditions can be detected by one or more of the controllers that may indicate a fault in one of the powertrain components, such as the motor 16, the generator 32, or the VVC. A fault can include a temperature, voltage, current, speed, or other readings that are above or below a respective threshold. When a fault in one of the components is detected, a limited operation strategy (LOS) can be implemented to enable the operator of the vehicle to continue to drive while certain individual components are disabled. This prevents complete shutdown of the vehicle 10, which can be undesirable to drivers. The fault conditions that may cause the vehicle 10 and/or VSC 12 to enter a LOS mode can include temperature, current and/or voltage of a powertrain component being outside an acceptable threshold. A reading of a value outside a threshold can cause the VSC 12 to command an individual shutdown of that component, while commanding a LOS mode to allow the operator of the vehicle 10 to continue driving.

Figure 3:
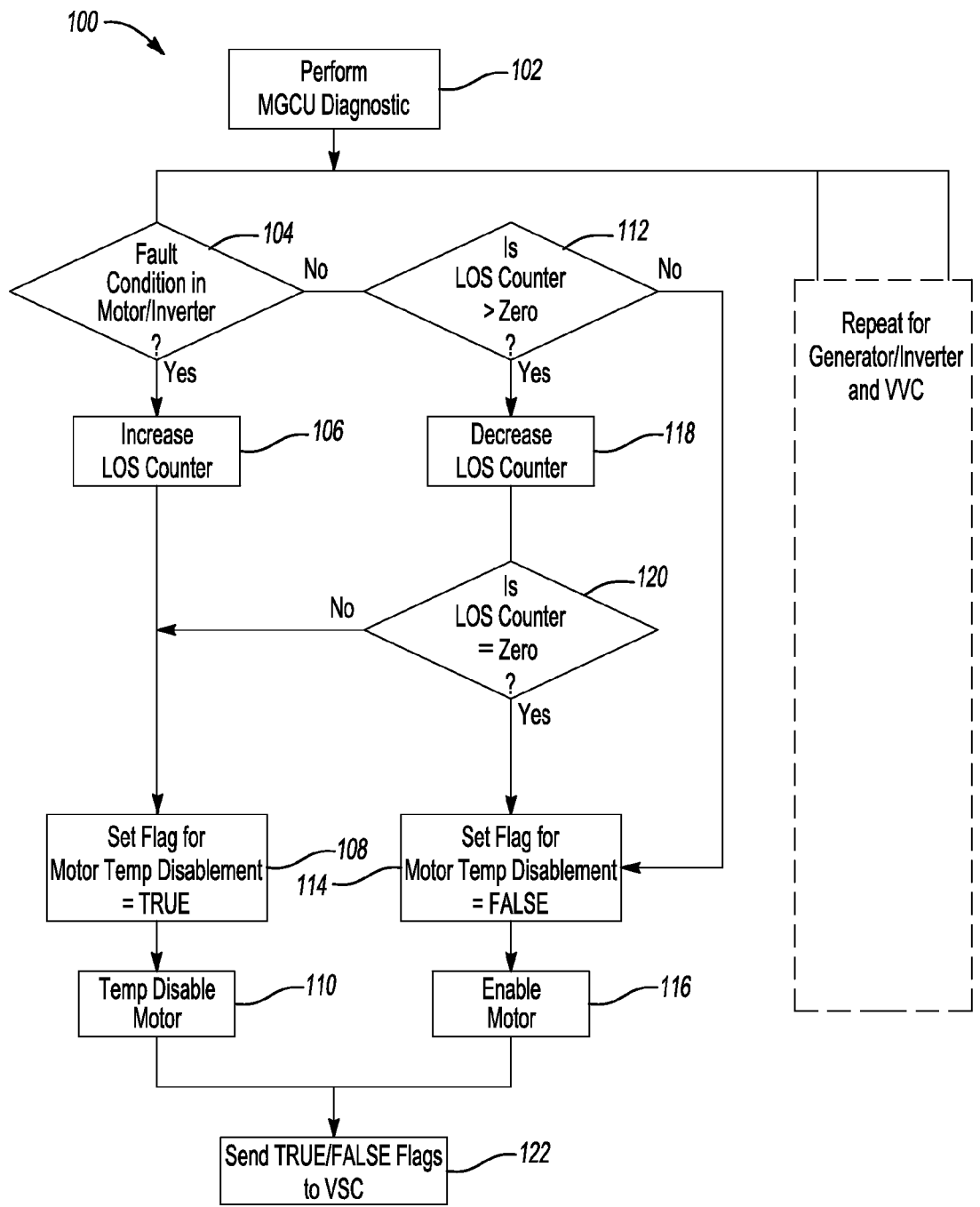
FIG. 3 is a flow chart of an algorithm implemented in a control system of the vehicle.

Referring to FIG. 3, one embodiment of the LOS mode is illustrated at 100. A diagnostic is performed on each of the motor 16 and/or motor inverter, the generator 32 and/or generator inverter, and the VVC. The diagnostic determines if a LOS mode is necessary such that a temporary disabling of that component should be commanded. At 102, the MGCU 70 begins performing the diagnostic. At 104, it is determined whether or not a fault condition exists in the motor 16 and/or motor inverter. If there is such a fault condition, then at operation 106 an LOS counter is increased. The LOS counter is a single digit counter or identification means. Once the LOS counter is increased by 1, at operation 108, a motor temporary disablement flag is flagged as TRUE. The motor 16 is requested to be disabled by opening switches in the motor inverter at operation 110.

If it is determined at operation 104 that there is no fault condition in the motor 16 and/or motor inverter, it is determined at operation 112 whether the LOS counter is greater than 0. If the LOS counter is not greater than 0, the motor temporary disablement flag is flagged as FALSE, and the motor 16 is requested to be enabled (or continued to be enabled) at operation 116. However, if at operation 112 it is determined that the LOS fault counter is greater than 0, then the LOS counter is decremented or decreased at operation 118. At operation 120, after the LOS counter has been reduced, it is determined whether the fault counter has reached 0. If the LOS counter is 0, then the method proceeds to operation 114. If the fault counter is still above 0, then the method proceeds to operation 108. Finally, at operation 122, the TRUE and FALSE flags are sent to the VSC 12, in which the VSC 12 acts according to the description provided with reference to FIG. 4.

Operation 120 ensures that even if it is determined that there is no fault condition in the motor 16 and/or the motor inverter, the motor 16 will continue to be temporarily disabled at operation 110 if the LOS fault counter is still above 0. This allows the diagnostic to continue to run multiple times while reducing the LOS fault counter each time the diagnostic is run, until the counter reaches 0. Multiple checks of the motor 16 and/or the motor inverter are therefore conducted while the motor 16 is disabled before re-enabling the motor 16 if no fault condition is detected.

The diagnostic performed by the MGCU 70 works to temporarily disable the motor 16 in the event a fault condition is detected. While the motor 16 is temporarily disabled, the vehicle 10 operates in a temporarily reduced power mode. However, if the fault condition only exists for a short amount of time (e.g., under 1 second), the LOS mode will stop and the motor 16 will be re-enabled quickly, thus reducing the disturbances felt by the operator of the vehicle 10. It should be understood that the entire diagnostic can be accomplished in micro-seconds or milliseconds, and thus the time the motor 16 is temporarily disabled may not be detected by the operator of the vehicle 10.

As indicated in FIG. 3, the LOS mode 100 and the performing of diagnostics at operation 102 is accomplished for both the generator 32 and the VVC as well as the motor 16. The diagnostics are accomplished for the motor 16, the generator 32, and the VVC generally simultaneously such that a check for fault conditions is continuous in each component. The MGCU 70 can thus temporarily disable any or all of the motor 16, the generator 32, or the VVC. It is contemplated that the diagnostics can also be accomplished for other components, such as the engine 18.

Figure 4:
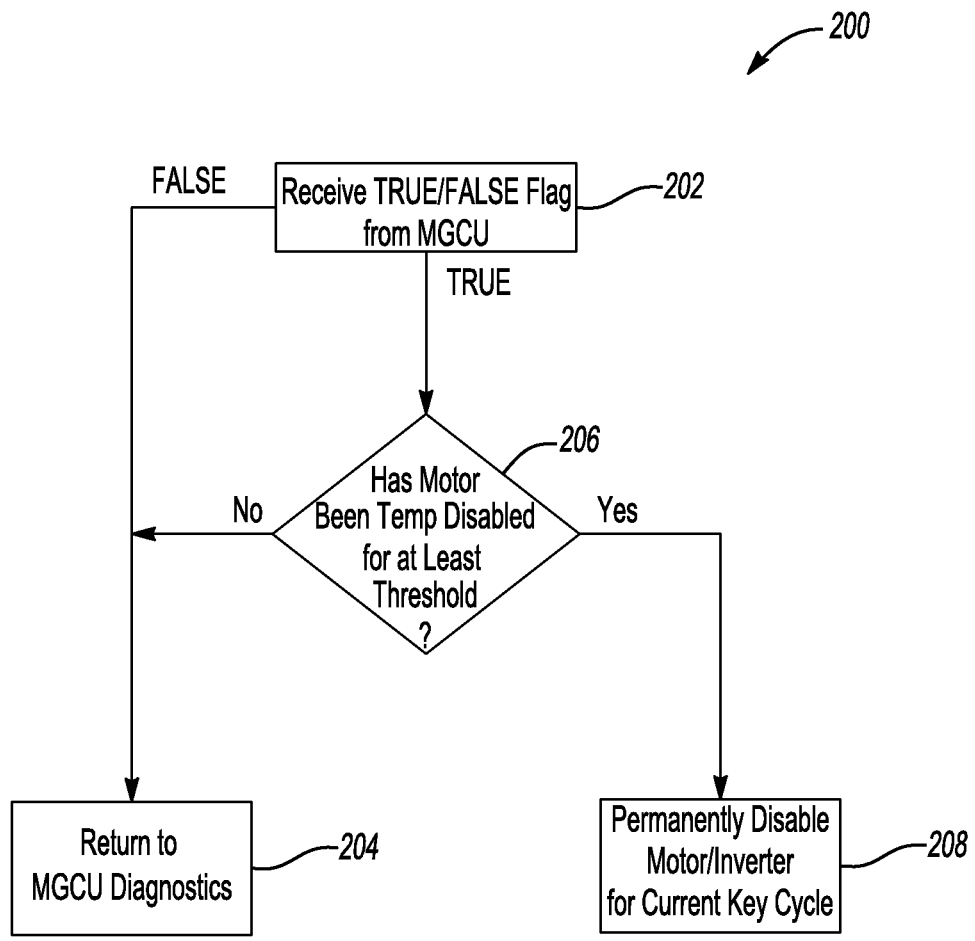
FIG. 4 is a flow chart of another algorithm implemented in the control system of the vehicle.

Referring to FIG. 4, a flowchart of an algorithm implemented by a controller, or the VSC 12 is illustrated at 200. As previously described, the MGCU 70 sets a flag for either TRUE or FALSE at operations 108 and 114. These flags correspond to whether the motor 16 is commanded to be either disabled or enabled, respectively. At operation 202, the TRUE and/or FALSE flags are received by the VSC 12 from the MGCU 70. If the flag is FALSE, then at operation 204 the VCU commands the MGCU 70 to return to its diagnostic check again at operation 102.

However, if the flag is TRUE, then at operation 206 a determination is made as to whether the motor 16 has been temporarily disabled for at least a threshold time. If the motor 16 has been disabled for at least the threshold time, then the motor 16 is permanently disabled for the current power cycle or key cycle at operation 208. A new key cycle is indicated by a full shutdown and restart of the vehicle 10. During a new key cycle, the motor 16 can be re-enabled, as will be described with reference to FIG. 5. In one embodiment, the threshold time is about one second, such that the motor 16 will be permanently disabled during the current key cycle if it has been temporarily disabled for at least one second.

The algorithms described with reference to FIGS. 3-4 provide for a diagnostics check of the motor 16, the generator 32, the VVC, or any other powertrain component. In short, if the particular powertrain component is detected to be operating under a fault condition, that component is temporarily disabled. Diagnostics continuously run on that component while it is temporarily disabled. If the component recovers from its fault condition and operates under normal conditions within the time threshold, the component can be re-enabled. If, however, the component fails to recover from its fault condition within the time threshold, the component is permanently disabled during the current key cycle, and can only be re-enabled upon a new key cycle (e.g., turning the vehicle off and on).

Figure 5:
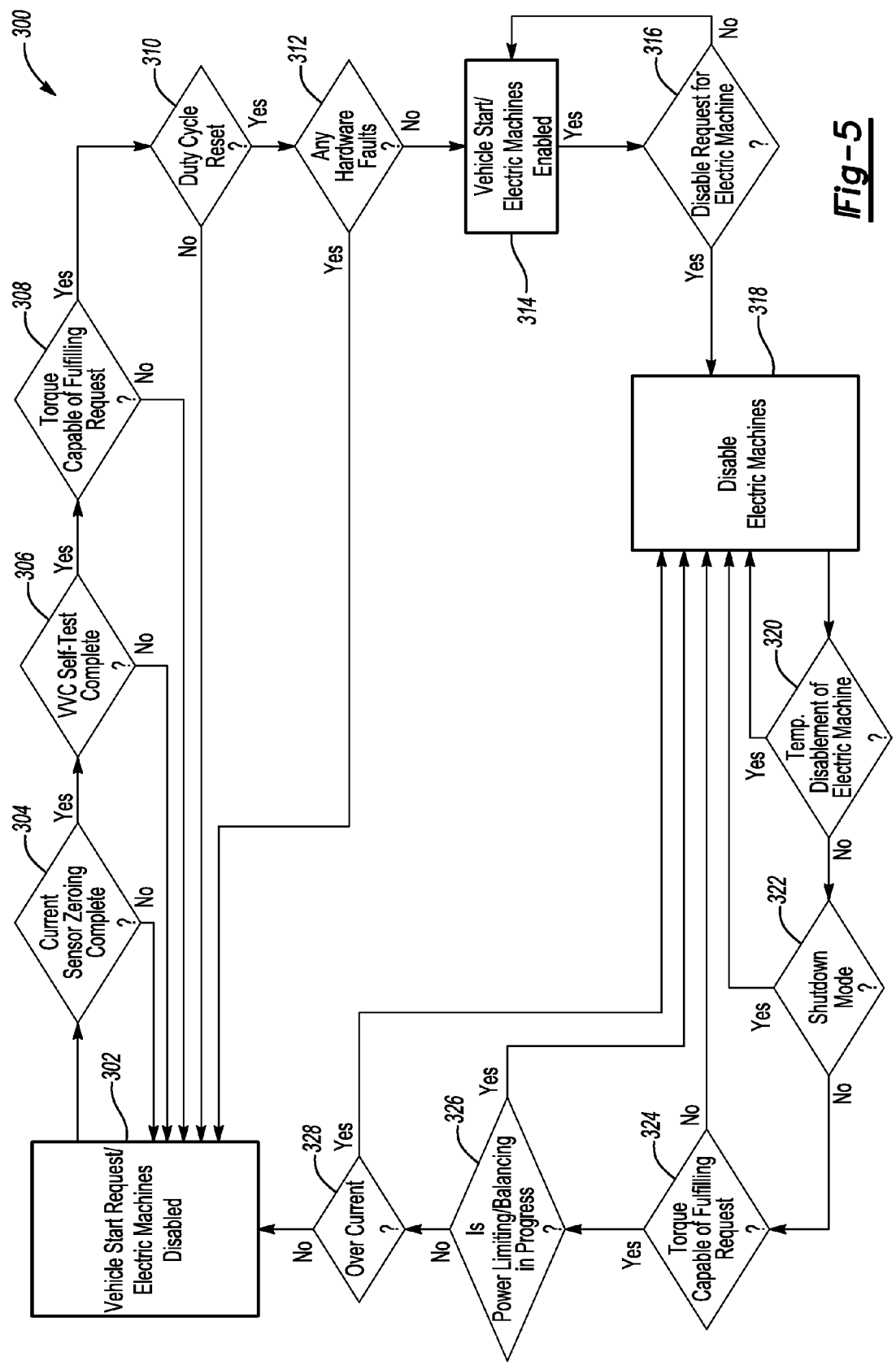
FIG. 5 is a flow chart of yet another algorithm implemented in the control system of the vehicle.

Referring to FIG. 5, a flow chart of another algorithm implemented by the controllers in the vehicle 10 is provided at 300. At operation 302, the vehicle is requested to start and a new key cycle is commanded. Initially the motor 16, generator 32, and/or VVC (i.e., "the electric machines") are disabled. Operations 304-312 are pre-start safety checks before initializing of the vehicle 10 and the electric machines can begin at 312. Examples of the checks are described below.

At operation 304, the current sensor zeroing must be complete throughout the electric machines. The current sensors must be zeroed while the current is zero in order to have accurate readings for when the current spikes during startup. At operation 306, a self-test of the VVC is accomplished, such that faults within the VVC are detected and resolved. At operation 308, a determination is made as to whether there are any torque failures present. In other words, the available power and/or torque of the electric machines must be evaluated such that the any requested torque can be fulfilled by the electric machines.

At operation 310, the duty cycle commands provided to the electric machine are disabled or reset by the controller. This puts the electric machine in a safe mode, thus protecting the hardware. Only after the fault conditions are removed can the duty cycle commands be re-enabled, allowing the electric machine to be safely controlled. This is considered to be a "soft restart" in which no new key cycle necessary, rather than a "hard restart" in which the vehicle must be shut down. At operation 312, any faults present in the hardware are determined before enabling the vehicle 10 to start.

If all operations 304-312 provide for a positive safety check of the vehicle 10, then the vehicle 10 is requested to start at 314. The electric machines are also fully enabled, and the vehicle 10 can be driven.

During operation of the vehicle 10, the diagnostic algorithms described with reference to FIGS. 3 and 4 at 100 and 200 are accomplished at operation 316. The electric machines are continuously checked for faults such that any of them can be temporarily disabled, according to the methods previously described. If a request to disable any of the electric machines is determined at operation 316, the electric machine is disabled at 318. In order to re-enable the electric machine, the controllers in the vehicle 10 must accomplish the safety checks in operations 320-328 and then operations 302-312 before re-enabling the electric machine again at operation 314.

At operation 320, the controller determines whether a temporary disablement of the electric machine is still being required, as requested at operations 110 of FIG. 3. Once an enabling request of the electric machine is sent, as defined by operation 116 of FIG. 3, the algorithm can proceed to operation 322. At operation 322, it is determined whether or not the electric machine is requested to be in a shutdown or permanent disablement mode. At operation 324, another torque fulfillment check is completed, similar to that of operation 308. A power limiting and balancing check is accomplished at 326. In this check, the controller determines whether a process is underway in which electrical power is balanced between the motor 16 and the generator 32 such that one of the electrical machines does not have power or torque limit much greater than the other electrical machine. At operation 328, an over-current check is accomplished in which the controller determines whether any electric machine is supplied with or is outputting a current value over a given threshold. If all checks at operations 320-328 are satisfactory, the remaining checks at operations 302-312 are accomplished until the disabled electric machine is re-enabled at operation 314.

It should be understood that in FIGS. 3-5, while references have been made to disabling and enabling the motor 16, similar algorithms are contemplated to apply to the generator 32 and the VVC. In other words, if a fault condition is present in any of the motor 16, the generator 32 or the VVC, the methods described above can apply to any of these components and other powertrain components.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an electric motor/generator; and
   at least one controller configured to, in response to a disabling of the electric motor/generator during a drive cycle, (i) reset duty cycle commands for the electric motor/generator and (ii) re-enable the electric motor/generator during the drive cycle within a predefined time period from the disabling of the electric motor/generator.

2. The vehicle of claim 1, wherein the at least one controller is further configured to, in response to the electric motor/generator being disabled for a time period greater than the predefined time period, inhibit the electric motor/generator from being re-enabled during the drive cycle.

3. The vehicle of claim 2 further comprising another electric motor/generator, wherein the at least one controller is further configured to increase a power to the another electric motor/generator in response to the disabling of the electric motor/generator.

4. The vehicle of claim 2 further comprising an engine, wherein the at least one controller is further configured to start the engine in response to the electric motor/generator being disabled for a time period greater than the predefined time period.

5. The vehicle of claim 1, wherein the predefined time period is approximately 1 second.

6. A method of controlling an electric motor/generator in a vehicle comprising:
disabling the electric motor/generator during a drive cycle of the vehicle in response to detecting a presence of a fault condition associated with the electric motor/generator; and
re-enabling the electric motor/generator during the drive cycle within a predefined time period from the disabling of the electric motor/generator in response to detecting an absence of the fault condition.

7. The method of claim 6 further comprising, prior to the re-enabling of the electric motor/generator, resetting duty cycle commands for the electric motor/generator.

8. The method of claim 6 further comprising preventing the re-enabling of the electric motor/generator during the drive cycle in response to the electric motor/generator being disabled for a time period greater than the predefined time period.

9. The method of claim 6, wherein the fault condition is indicative of a temperature of an inverter operatively arranged with the electric motor/generator being greater than a threshold temperature.

10. The method of claim 6, wherein the fault condition is indicative of a voltage of an inverter operatively arranged with the electric motor/generator being greater than a threshold voltage.

11. The method of claim 6, wherein the predefined time period is approximately 1 second.

12. A method of controlling an electric motor/generator in a vehicle comprising:
disabling the electric motor/generator during a drive cycle of the vehicle in response to detecting a presence of a fault condition associated with the electric motor/generator;
resetting duty cycle commands for the electric motor/generator; and
re-enabling the electric motor/generator during the drive cycle in response to detecting an absence of the fault condition.

13. The method of claim 12, wherein the fault condition is indicative of a temperature of an inverter operatively arranged with the electric motor/generator being greater than a threshold temperature.

14. The method of claim 12, wherein the fault condition is indicative of a voltage of an inverter operatively arranged with the electric motor/generator being greater than a threshold voltage.

* * * * *